United States Patent [19]
Kristal

[11] Patent Number: 5,853,856
[45] Date of Patent: Dec. 29, 1998

[54] PROCESS FOR FORMING BUBBLE-PACK

[75] Inventor: Boaz Kristal, Netanya, Israel

[73] Assignee: Tirod Industrial Packaging Ltd., Netanya, Israel

[21] Appl. No.: 764,909

[22] Filed: Dec. 13, 1996

[51] Int. Cl.$^6$ .............................. B32B 3/12; A63B 39/00
[52] U.S. Cl. ..................... 428/178; 156/147; 156/290; 156/308.4
[58] Field of Search ................... 428/178, 174, 428/166; 156/145, 209, 290, 147, 292, 308.4

[56] References Cited

U.S. PATENT DOCUMENTS

| | | | |
|---|---|---|---|
| 3,195,686 | 7/1965 | Johnson | 428/178 |
| 3,294,387 | 12/1966 | Chavannes | 428/178 |
| 4,412,879 | 11/1983 | Ottaviano | 428/178 |
| 4,417,936 | 11/1983 | Gaffney | 428/178 |

*Primary Examiner*—Donald Loney
*Attorney, Agent, or Firm*—Mark M. Friedman

[57] ABSTRACT

A process for producing bubble-pack. Bulges are formed in a first sheet by a combination of mechanical pressure, vacuum and air pressure, without using the high temperatures associated with the prior art processes. A second sheet is sealed to the first sheet, opposite the bulges, by contacting the sheets and heating them only along the area of contact. The process of the present invention is suitable for forming bubble-pack from a wider variety of materials, notably HDPE, and bubble-pack with a lower weight per unit area, than are the prior art processes.

30 Claims, 3 Drawing Sheets

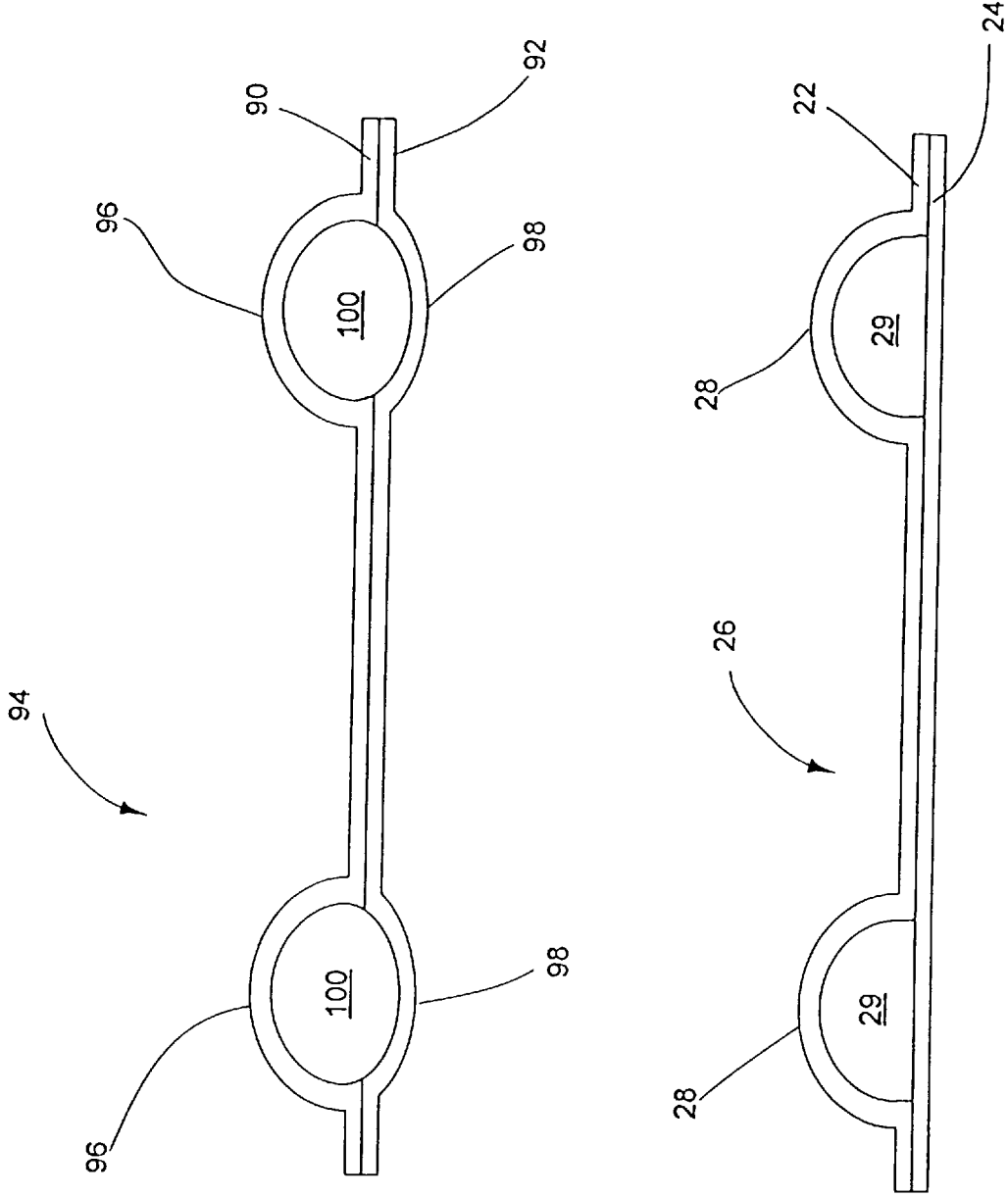

PROCESS FOR FORMING BUBBLE-PACK

FIELD AND BACKGROUND OF THE INVENTION

The present invention relates to packaging materials and, more specifically, to a new process for forming the packaging material commonly known as "bubble-pack".

Bubble-pack is a material formed of two layers of plastic, almost invariably low density polyethylene (LDPE). One layer has an array of bulges formed therein, with all the bulges facing in a common direction. The other layer is sealed onto the first layer, on the side facing away from the bulges. This traps air within the bulges, forming a packing material that readily absorbs shocks.

FIG. 1 illustrates a prior art process for the manufacture of bubble-pack. A hollow wheel 10 is provided with depressions 12 in its rim. Each of depressions 12 is provided with a channel 14 leading into the interior of wheel 10. As wheel 10 rotates in a counterclockwise direction past vacuum chamber 16, a partial vacuum is created in passing depressions 12 via channels 14 thereof.

From an extruder 20 are extruded a first sheet 22 of LDPE and a second sheet 24 of LDPE, typically at a temperature of between 180° C. and 200° C. Sheet 22 is drawn into depressions 12 by the partial vacuum in chamber 16, creating bulges 28 in sheet 22. Sheet 24 merges with sheet 22 at the point of contact of wheel 10 with a second wheel 30 that rotates clockwise. The pressure on sheets 22 and 24 at the contact of wheels 10 and 30 seals sheet 24 to the side of sheet 22 opposite bulges 28, forming bubble-pack 26 having sealed bubbles 29.

In a variant of the process illustrated in FIG. 1, sheets 22 and 24 are provided from preformed rolls of LDPE, and are heated by being passed over heated rollers prior to being joined on wheels 10 and 30.

One drawback of the process illustrated in FIG. 1 is that it is suitable only for LDPE. In particular, it is not suitable for high density polyethylene (HDPE), so that the higher mechanical rigidity of HDPE compared to LDPE cannot be exploited in packaging materials of this type. Sheets 22 and 24 of HDPE must be bonded to each other at a higher temperature than the range of 180° C. to 200° C. used for LDPE, at which higher temperature bulges 28 tend to break. Even at the lower temperature range used for LDPE, HDPE tends to warp, so that the prior art process would not be suitable for forming HDPE bubble-pack even if HDPE could be bonded by temperatures in the LDPE bonding range. The higher mechanical strength of HDPE compared to LDPE (two to three times as strong per unit weight) can be incorporated in bubble-pack 26 to a limited extent by attaching a sheet of HDPE to bubble-pack 26 on the side opposite bulges 28, but this greatly increases the cost of the process.

There is thus a widely recognized need for, and it would be highly advantageous to have, a process for the production of bubble-pack suitable for the production thereof from HDPE.

SUMMARY OF THE INVENTION

According to the present invention there is provided a process for joining a first sheet and a second sheet to form a bubble-pack, comprising the steps of: (a) forming a plurality of bulges in the first sheet, the bulges facing convexly in a common direction away from the first sheet; the bulges defining between them a flat region of the first sheet; (b) applying the second sheet to the first sheet on a side of the first sheet opposite to the common direction, the second sheet contacting the first sheet only along the flat region; and (c) heating solely the flat region, thereby sealing the second sheet to the first sheet along the flat region.

According to the present invention there is provided an article of manufacture comprising a first sheet and a second sheet joined along facing surfaces thereof, the first sheet having a plurality of bulges concave towards the second sheet, the second sheet having a plurality of bulges, opposite the bulges of the first sheet, concave towards the first sheet, each of the bulges of the first sheet and the opposite bulges of the second sheet forming between them a sealed bubble.

According to the present invention, the sheets of plastic material that are joined to form the bubble-pack are heated only along their surface of contact. Bulges are formed in the first sheet by a (relatively) cold process, using a combination of mechanical pressure and air pressure on one side of the sheet and vacuum on the other side of the sheet, before the two sheets are joined. This process is suitable for forming bubble-pack in a variety of materials which have heretofore been unusable for this purpose, including HDPE, PET, PVC and polypropylene. In additional to higher mechanical strength, HDPE and PET have the advantage over LDPE that bubbles 29 made of HDPE and PET can hold air and other gases at higher pressures than bubbles 29 made of LDPE. In addition, the input sheets may be as thin as about 10 microns, providing a 20 micron thick bubble-pack, significantly thinner than the prior art bubble-packs, which, because of the lower mechanical strength of LDPE, are not thinner than about 55 microns. Thus, bubble-pack made according to the process of the present invention can be significantly lighter, per unit area, than bubble-pack made by the prior art processes.

BRIEF DESCRIPTION OF THE DRAWINGS

The invention is herein described, by way of example only, with reference to the accompanying drawings, wherein:

FIG. 3A (prior art) is a cross section through bubble-pack material made by the process of FIG. 1;

FIG. 3B is a cross section through bubble-pack material made by the process of FIG. 2.

DESCRIPTION OF THE PREFERRED EMBODIMENTS

The present invention is of a process for manufacturing bubble-pack which can be used to form bubble-pack from a wider variety of plastic sheeting than the prior art process. Specifically, the present invention can be used to make bubble-pack of materials of relatively high mechanical strength, such as HDPE.

The principles of the manufacture of bubble-pack according to the present invention may be better understood with reference to the drawings and the accompanying description.

Figure 1:
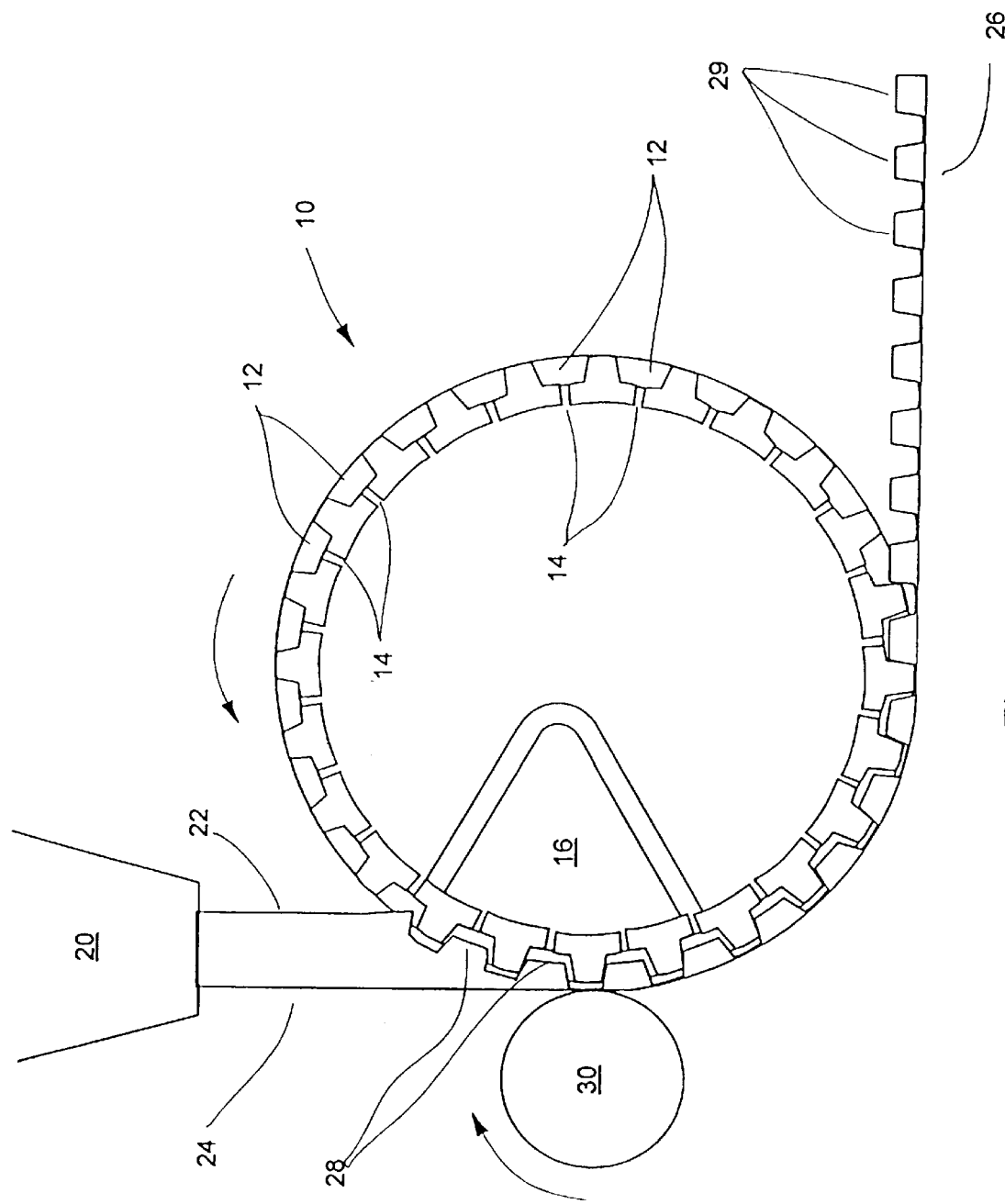
FIG. 1 (prior art) is a schematic illustration of the prior art process for making bubble-pack.
Figure 2:
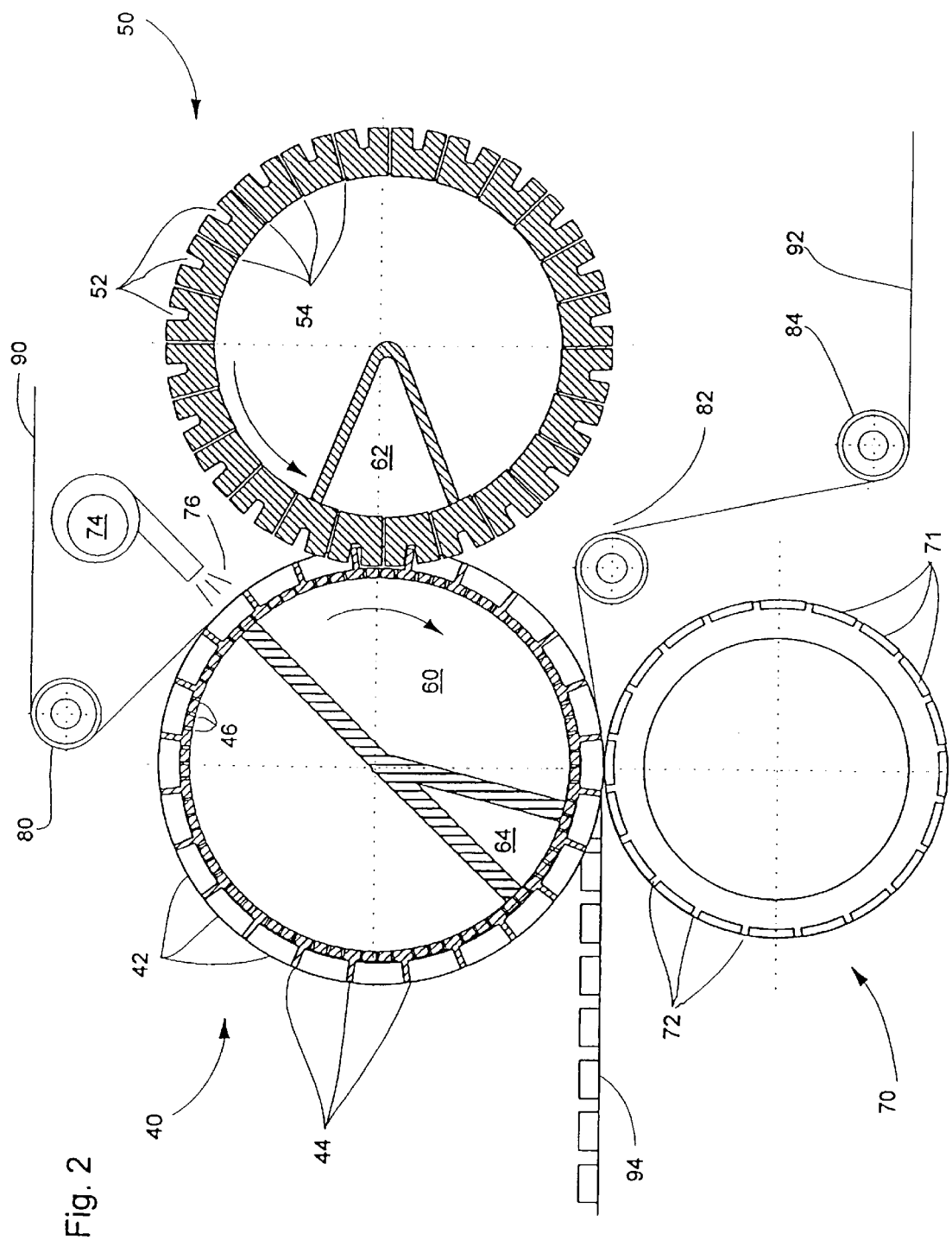
FIG. 2 is a schematic illustration of the process of making bubble-pack according to the present invention.

Referring now to the drawings, FIG. 2 shows schematically one embodiment of the process of the present invention for making bubble-pack. A hollow wheel 40 has a plurality of depressions 42 in its rim. Channels 46 connect depressions 42 to the interior of wheel 40. A second hollow wheel 50 has a plurality of slots 52 in its rim. A plurality of channels 54, between slots 52, extend through the rim of wheel 50. The space between pairs of slots 52 matches the circumferential length of each of depressions 42, and slots 52 are sized to engage walls 44 of depressions 42, as shown. Wheel 40 rotates in a clockwise direction past a vacuum chamber 60 and a high pressure chamber 64. Wheel 50 rotates in a counterclockwise direction past a high pressure chamber 62, and engages wheel 40 between vacuum chamber 60 and high pressure chamber 62.

A first sheet 90 of a plastic material such as HDPE is fed via a roller 80 through the contact area between wheels 40 and 50. A vacuum of between about 0.2 millibars and about 10 millibars is maintained in vacuum chamber 60. A pressure of between about 2 atmospheres and about 8 atmospheres is maintained in high pressure chamber 62. Between them, the vacuum in chamber 60, the pressure in chamber 62 and the mechanical force of the engagement of wheels 40 and 50 urges sheet 90 into depressions 42, which act as molds within which bulges are formed in sheet 90. Optionally, hot air 76, at a temperature of between about 50° C. and about 150° C., may be blown onto sheet 90 as sheet 90 comes into contact with wheel 50 to pre-soften sheet 90, the most preferred air temperature for pre-softening HDPE being about 75° C. With or without presoftening, however, bulges are formed in sheet 90 at a significantly lower temperature than in the prior art process.

A third wheel 70, having depressions 71 in its rim, contacts wheel 40 opposite vacuum chamber 60 near the wall between vacuum chamber 60 and high pressure chamber 64, while rotating counterclockwise at the same circumferential speed at which wheel 40 rotates clockwise. Each of depressions 71 and depressions 42 has substantially the same circumferential length, so that walls 72 that separate depressions 71 and walls 44 that separate depressions 42 also have substantially the same circumferential length. Thus, wheels 40 and 70 contact each other only along walls 71 and 44, i.e., outside of the portion of sheet 90 occupied by bulges and along the portion of sheet 90 that remains flat after the molding process described above.

A second sheet 92 of suitable backing material is fed via rollers 84 and 82 through the contact area between wheels 40 and 70, on the side of sheet 90 opposite the bulges. Suitable materials include HDPE, LDPE, laminated materials, and indeed any material, including aluminum foil, that can be formed into a flexible sheet and bonded by heat to sheet 90. The rim of wheel 70 is heated to a temperature of between about 150° C. and 250° C. This heat seals sheet 92 to sheet 90, but because wheels 40 and 70 contact only along walls 44 and 72, the heat is applied only to the flat region of contact between sheets 90 and 92, and not to the portion of sheet 90 occupied by bulges. Air pressure of up to about 2 atmospheres in high pressure chamber 64 then forces sheet 90 out of depressions 42, releasing fully formed bubble-pack 94.

Bubble-pack 94 is shown in more detail in cross-section in FIG. 3B. Bulges 96 are formed in sheet 90 by the process described above. Sealed bubbles 100 formed between sheets 90 and 92 contain air at a pressure greater than atmospheric pressure, forming bulges 98 in sheet 92 that bow away from bulges 96. By contrast, in bubble pack 26 formed by one of the prior art processes, and shown in cross-section in FIG. 3A, sheet 24 is substantially flat, even opposite bulges 28.

While the invention has been described with respect to a limited number of embodiments, it will be appreciated that many variations, modifications and other applications of the invention may be made.

What is claimed is:

1. An article of manufacture comprising a first sheet and a second sheet joined along facing surfaces thereof, said first sheet including only a material selected from the group consisting of HDPE and PET, said first sheet having a plurality of bulges concave towards said second sheet, said second sheet and each of said bulges of said first sheet forming between them a sealed bubble.

2. The article of manufacture of claim 1, wherein each of said sealed bubbles contains air at a pressure higher than about 1 atmosphere.

3. The article of manufacture of claim 1, wherein said material is HDPE.

4. The article of manufacture of claim 1 wherein said first sheet has a thickness between about 10 microns and about 25 microns.

5. The article of manufacture of claim 1, wherein said first sheet has a thickness of at most about 10 microns.

6. The article of manufacture of claim 1, wherein said second sheet has a plurality of bulges, opposite said bulges of said first sheet and concave towards said first sheet, each of said sealed bubbles being formed by one of said bulges of said first sheet and an opposite said bulge of said second sheet.

7. The article of manufacture of claim 6, wherein said sealed bubbles contain air, said bulges of said second sheet being formed by a pressure of said air greater than atmospheric pressure.

8. An article of manufacture comprising a first sheet and a second sheet joined along facing surfaces thereof, said first sheet having a plurality of bulges concave towards said second sheet, said second sheet having a plurality of bulges, opposite said bulges of said first sheet, concave towards said first sheet, each of said bulges of said first sheet and said opposite bulges of said second sheet forming between them a sealed bubble containing air, said bulges of said second sheet being formed by a pressure of said air greater than atmospheric pressure.

9. A process for joining a first sheet and a second sheet to form a bubble-pack, comprising the steps of:

(a) forming a plurality of bulges in the first sheet, said bulges facing convexly in a common direction away from the first sheet; said bulges defining between them a flat region of the first sheet;

(b) applying the second sheet to the first sheet on a side of the first sheet opposite to said common direction, the second sheet contacting the first sheet only along said flat region; and (c) heating both the first sheet and the second sheet solely along said flat region as the second sheet contacts said flat region, thereby sealing the second sheet to the first sheet along said flat region.

10. The process of claim 9, further comprising the step of:

(d) softening the first sheet, prior to said forming of said bulges.

11. The process of claim 10, wherein said softening is effected by blowing hot air having a temperature of between 50° C. and 150° C. on said first sheet.

12. The process of claim 9, wherein said forming of a plurality of bulges is effected by urging the first sheet into a plurality of molds.

13. The process of claim 12, wherein said urging is effected by applying positive pressure on a side of the first sheet facing opposite to said common direction.

14. The process of claim 13, wherein said positive pressure is between about 2 atmospheres and about 8 atmospheres.

15. The process of claim 12, wherein said urging is effected by applying negative pressure on a side of the first sheet facing in said common direction.

16. The process of claim 15, wherein said negative pressure is provided by a partial vacuum of between about 0.2 millibars and about 10 millibars.

17. The process of claim 12, further comprising the step of:

(d) releasing the first sheet from said molds.

18. The process of claim 17, wherein said releasing is effected by applying positive pressure on said side of the first sheet facing in said common direction.

19. The process of claim 18, wherein said positive pressure is up to about 2 atmospheres.

20. The process of claim 9, wherein said heating is effected at a temperature between about 150° C. and about 250° C.

21. A process for forming a bubble-pack, comprising the steps of:

(a) providing a plurality of substantially identical molds on a rim of a first wheel, neighboring said molds being separated by walls;

(b) providing a second wheel having a plurality of slots on a rim thereof that match said walls;

(c) engaging said first wheel with said second wheel;

(d) rotating said wheels in opposite directions, so that said walls enter and leave said slots; and (e) causing a first sheet to pass between said wheels as said wheels are rotated, so that said first sheet is drawn between said wheels and urged into said molds, thereby forming a plurality of bulges in said first sheet, said bulges all facing in a common direction.

22. The process of claim 21, further comprising the step of:

(f) applying negative pressure to said molds to draw said first sheet into said molds.

23. The process of claim 22, wherein said negative pressure is provided by a partial vacuum between about 0.2 millibars and about 10 millibars.

24. The process of claim 21, wherein said second wheel includes a rim having a plurality of channels therethrough, the method further comprising the step of:

(f) applying positive air pressure to said first sheet via said channels to urge said first sheet into said molds.

25. The process of claim 24, wherein said positive air pressure is between about 2 atmospheres and about 8 atmospheres.

26. The process of claim 21, further comprising the step of:

(f) releasing said first sheet from said molds.

27. The process of claim 26, wherein said releasing is effected by applying positive pressure on a side of said first sheet facing in said common direction.

28. The process of claim 27, wherein said positive pressure is up to about 2 atmospheres.

29. The process of claim 21, wherein said bulges define between them a flat region of said first sheet, the process further comprising the steps of:

(f) applying a second sheet to said first sheet on a side of said first sheet opposite to said common direction, said second sheet contacting said first sheet only along said flat region; and (g) heating both said first sheet and said second sheet solely along said flat region as said second sheet contacts said flat region, thereby sealing said second sheet to said first sheet along said flat region.

30. The process of claim 29, wherein said heating is effected at a temperature between about 150° C. and about 250° C.

* * * * *